Patented Apr. 7, 1936

2,036,291

UNITED STATES PATENT OFFICE

2,036,291

METHOD OF RECOVERING VALUES FROM ZINC SPELTER SKIMMINGS

Lewis E. McDermut, Chicago, Ill.

No Drawing. Application August 20, 1934, Serial No. 740,672

3 Claims. (Cl. 75—18)

This invention relates to a process for recovering values from zinc skimmings such as are formed in zinc galvanizing processes and other commercial processes where zinc is heated, melted and/or volatilized.

More specifically this invention relates to the treatment of zinc skimmings composed largely of ammonium chloride and zinc oxide with smaller quantities of metallic zinc, zinc chloride and zinc oxychloride, with an alkaline earth metal compound to liberate the ammonium, zinc, and chloride values in a form in which they may be readily recovered.

Zinc skimmings, sometimes known as sal-skim or skimmings, are by-products of the various processes used in the hot galvanizing industry and as pointed out above are composed largely of ammonium chloride and zinc oxide with smaller quantities of metallic zinc, zinc chloride and zinc oxychloride. Iron, aluminum, tin, lead and copper are sometimes also present in the form of their chlorides, oxides or oxychlorides.

To recover the values from zinc skimmings, it is necessary that the various compounds of ammonia, zinc and chlorine be separated. To accomplish this separation, it is necessary to eliminate, liberate or dissociate the ammonia from the other remaining substances so that these substances will be free from complications arising because of the presence of ammonia compounds.

The object of this invention, therefore, is to eliminate, liberate and/or dissociate the ammonium content of zinc skimmings from the other substances therein in such manner that the ammonium, zinc and chloride values may be recovered economically.

Another object of this invention is to provide a process for separating zinc skimmings into materials which may be used in industry.

Another object of this invention is to treat zinc skimmings with an alkaline earth metal compound to recover values in the skimmings.

Other and further objects of this invention will be apparent from the following detailed description and appended claims.

While any carbonate or oxide of barium, strontium, calcium, and magnesium (alkaline earth metals) is operative as the treating agent in my process, I prefer to use calcium carbonate because of its cheapness. The following steps outlining my process, therefore, refer to the use of calcium carbonate as the treating agent. It should be understood, however, that any compound of an alkaline earth metal may be used in place of the calcium carbonate.

Dry zinc skimmings and dry calcium carbonate are mixed together and mechanically ground to a fineness preferably of 60 mesh or finer. A fine mixture is desirable to establish mechanical contact association between the skimmings and the calcium carbonate. The amount of calcium carbonate to be added to a batch of zinc skimmings depends upon the analysis of the skimmings. It is obvious, of course, that each batch of zinc skimmings may vary widely in chloride content and since the calcium carbonate reacts with the chlorides, it is necessary that the calcium carbonate present and the chlorides present in the zinc skimmings be in molecular proportions. A slight excess of calcium carbonate is desirable to insure a complete reaction with the chlorides.

The finely ground and mechanically mixed zinc skimmings and calcium carbonate are next placed in a closed retort and heated sufficiently so that the chlorides present in the mixture are converted into calcium chloride. During this reaction, ammonium compounds are broken down and the ammonia is liberated together with water and carbon dioxide. As the heating operation progresses, the zinc chloride compounds are converted by the calcium carbonate into zinc oxide, with the formation of carbon dioxide and calcium chloride.

In the preliminary stages of the heating operation, the moisture hygroscopically associated with the zinc chloride is driven off, say at a temperature of around 250° F. Ammonia is next liberated at temperatures beginning around 250° F. and is all driven off in the temperature range 250° F. to 650° F. according to the following formula:

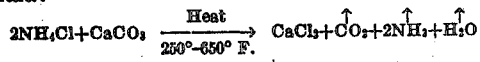

The temperature is not carried much above 650° F. until after the ammonia has been driven off, since otherwise fuming of the ammonium chloride might occur.

During the heating operation, the temperature is preferably continued at 650° F. for a period of about three to four hours. Thereafter the temperature is raised to about 1000° F. whereupon the zinc chloride present in the skimmings is broken down into zinc oxide and calcium chloride according to the following formula:

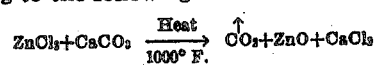

The gases liberated from the retort during the heating operation can be conducted into suitable apparatus for treatment and recovery of ammonium values in a desired form such as, for example, ammonia gas, aqueous ammonia, ammonium carbonate or ammonium bicarbonate. If ammonium carbonate and/or bicarbonate is formed, the same may be utilized in a subsequent step of this process as will be hereinafter described.

The zinc, zinc oxide and calcium chloride substances remaining in the retort after the heating operation are placed in a leaching tank wherein water is used to dissolve the calcium chloride, thereby separating this material from the insoluble zinc and zinc oxide. The calcium chloride solution may be treated as described in a subsequent step. The zinc and zinc oxide, being in sludge or moist cake form, are washed to remove any remaining calcium chloride therefrom. The wash cake is then dried to yield a commercial form of zinc and zinc oxide.

The calcium chloride solution may be treated in a suitable apparatus to evaporate the water therefrom and to yield a commercial form of calcium chloride which has many uses in industry. Alternatively, the calcium chloride solution may be treated with ammonium carbonate and/or ammonium bicarbonate, which have been recovered from a previously above described step in the process, to form ammonium chloride in solution and calcium carbonate as a precipitate. The calcium carbonate is, of course, useful in this process as the treating agent for a new batch of zinc skimmings and the ammonium chloride has many commercial uses.

The process of this invention, therefore, comprises five steps which may be briefly described as follows:

(1) Zinc skimmings intimately mixed and ground together with an alkaline earth metal carbonate.

(2) The ground mixture heated in a retort to liberate ammonium values therefrom and to convert the chlorides present into alkaline earth metal chlorides.

(3) Substances remaining in the retort after heating operations are leached in water to remove soluble alkaline earth metal chlorides therefrom.

(4) Insoluble material from leach tank consisting of zinc and zinc oxide is washed and dried to produce a commercial form of zinc and zinc oxide.

(5) The solution of alkaline earth metal chlorides from leach tank may be treated according to the following alternative methods:

(A) Evaporating the solution to recover a commercial form of alkaline earth metal chloride.

(B) Treating the alkaline earth metal chloride solution with ammonium carbonate or bicarbonate which may have been formed from the ammonia liberated in step 2 of the process to produce ammonium chloride and calcium carbonate, which may be readily separated by filtration. The calcium carbonate may be dried to produce a treating agent suitable for use in this process or for other commercial use. The ammonium chloride solution may be evaporated to produce a commercial form of ammonium chloride.

From the above description, it is evident that I have provided a process for recovering values from zinc skimmings by the use of an alkaline earth metal treating agent. The process is economical and may be carried out with standard apparatus. The loss of values during this process is extremely low and the treating agent used is capable of being recovered for reuse. As pointed out above, the amount of treating agent used should be slightly in excess of the total amount of chlorides present in the zinc skimmings so that all of the chlorides present will be converted into an alkaline earth metal chloride.

Having now described my invention, I am aware that numerous details of the process may be varied through a wide range without departing from the principles of this invention, and I, therefore, do not purpose limiting the patent granted hereon otherwise than necessitated by the prior art.

I claim as my invention:

1. The process of recovering values from zinc skimmings which comprises admixing said skimmings with an alkaline earth metal carbonate, heating the mixture to a temperature sufficient to eliminate ammonia therefrom and to convert the chlorides present into alkaline earth metal chlorides, forming a carbonate salt with the liberated ammonia, leaching out the alkaline earth metal chlorides from the insoluble zinc and zinc oxides present after the heating operation, recovering said zinc and zinc oxide, reacting the alkaline earth metal chlorides formed with the formed ammonium salts and recovering the resulting ammonium chloride and alkaline earth metal carbonates.

2. In the process of recovering values from zinc skimmings by heating a mixture of zinc skimmings and an alkali earth metal carbonate to liberate the ammonia and convert the chlorides present into alkaline earth metal chlorides, the steps which comprise forming an ammonium carbonate salt with the liberated ammonia, leaching out the alkaline earth metal chlorides formed, reacting said chlorides with the ammonium carbonate salt formed and recovering the resulting ammonium chloride and alkaline earth metal carbonate.

3. The process of recovering values from zinc spelter skimmings which comprises admixing said skimmings with calcium carbonate, grinding said mixture to form a fine powder, heating the powder to a temperature sufficient to liberate ammonia therefrom and to convert the chlorides present into calcium chloride, forming a carbonate salt with the liberated ammonia, leaching out the calcium chloride from the insoluble zinc and zinc oxide present after the heating operation, recovering said zinc and zinc oxide, reacting the calcium chloride formed with the formed ammonium carbonate salt and recovering the resulting ammonium chloride and calcium carbonate.

LEWIS E. McDERMUT.